(12) United States Patent
Nichols et al.

(10) Patent No.: US 7,891,115 B1
(45) Date of Patent: Feb. 22, 2011

(54) MATERIAL DRYING SYSTEM

(76) Inventors: Patrick C. Nichols, 9797 Squirrel Run, Blair, NE (US) 68008; Isaac Weddington, 2515 Creekside Dr., Hiawatha, IA (US) 52233; Charles P. Nichols, 9791 Squirrel Run, Blair, NE (US) 68008

( * ) Notice: Subject to any disclaimer, the term of this patent is extended or adjusted under 35 U.S.C. 154(b) by 0 days.

(21) Appl. No.: 12/834,960

(22) Filed: Jul. 13, 2010

(51) Int. Cl.
*F26B 19/00* (2006.01)
(52) U.S. Cl. .............................. 34/562; 34/570; 34/572; 34/92; 34/72; 34/73; 34/74
(58) Field of Classification Search .................... 34/523, 34/524, 526, 557, 558, 562, 565, 566, 570, 34/572, 72, 73, 74, 76, 90, 92; 62/324.1, 62/324.3, 324.6
See application file for complete search history.

(56) References Cited

U.S. PATENT DOCUMENTS

| | | | |
|---|---|---|---|
| 3,178,022 A * | 4/1965 | Balogh | ......................... 62/474 |
| 3,597,850 A | 8/1971 | Jenkins | |
| 3,914,874 A | 10/1975 | Bruce | |
| 4,126,948 A | 11/1978 | Vermehren | |
| 4,308,669 A | 1/1982 | Noyes | |
| 4,583,301 A | 4/1986 | Crowley | |
| 4,924,601 A | 5/1990 | Bercaw | |
| 5,575,083 A | 11/1996 | Lee | |
| 6,158,147 A | 12/2000 | Smith | |
| 6,715,705 B2 | 4/2004 | Rowley | |
| 6,996,917 B2 | 2/2006 | Anderson | |
| 2005/0217224 A1 | 10/2005 | Seebach | |
| 2008/0209755 A1 | 9/2008 | Shivvers | |

* cited by examiner

*Primary Examiner*—Jiping Lu
(74) *Attorney, Agent, or Firm*—Jeffrey A. Proehl; Woods, Fuller, Shultz & Smith, PC

(57) ABSTRACT

A material drying apparatus for removing moisture from material positioned in an envelope interior. The apparatus comprises an inlet structure, an air removal assembly to remove air from the interior, and a moisture removal assembly for removing moisture from gases from the interior. The assembly comprises a first moisture removal structure, a second moisture removal structure, and a heat pump for transferring heat in a selected direction between the first and second moisture removal structures. The heat pump alternately heats a heat exchanger of one moisture removal structure and cooling a heat exchanger of the other moisture removal structures. The apparatus comprises a control apparatus for controlling operation of the first and second moisture removal assemblies and the heat pump. The control apparatus is configured to sense a condition of the apparatus and reverse operation of the heat pump upon detecting that the condition has passed a predetermined level.

20 Claims, 15 Drawing Sheets

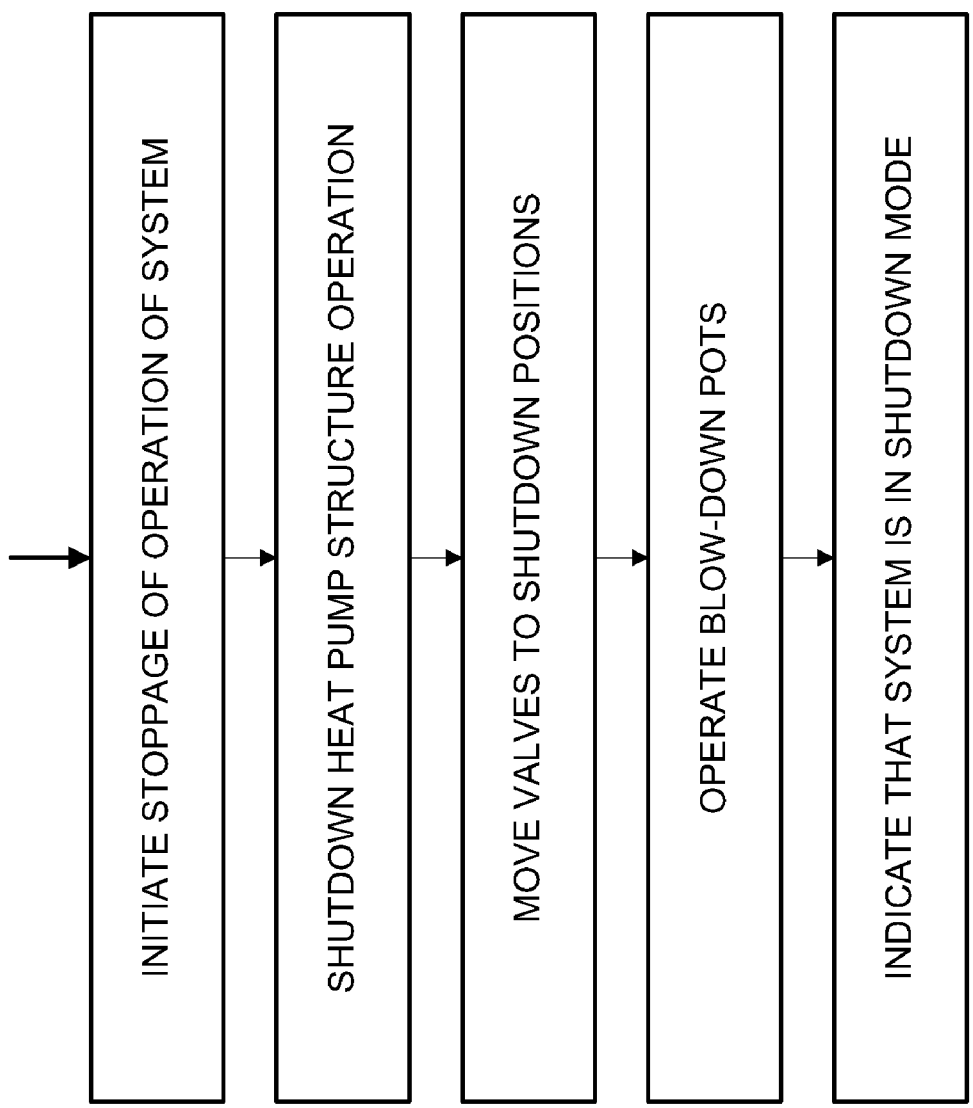

MATERIAL DRYING SYSTEM

BACKGROUND

1. Field

The present disclosure relates to grain drying systems and more particularly pertains to a new material drying system for effectively and efficiently removing moisture from a fixed volume of material, such as a grain positioned in a flexible bag located in a farm field.

2. Description of the Prior Art

It is common to attempt to remove moisture from a material, such as a quantity of grain after harvest, to bring the material to a desired level of moisture required for safe storage or processing of the grain. Commonly, the drying of grain involves the movement of air through the grain, and typically the air is heated by the burning of fossil fuels prior to moving the air through the grain stored in a bin. The drying of grain in this manner can be expensive when the initial level of moisture is high, and the cost can be unpredictable as the cost of the fuel rises and falls, particularly in the time of the year at harvest or shortly thereafter.

Others methods of drying are known, and one such method is disclosed in U.S. Pat. No. 3,914,874 to Bruce which discussed a system in which air and vapor are drawn out of the interior of an air-tight storage enclosure. While basically a good concept, the system disclosed in the Bruce patent requires a high level of supervision and attention which is typically not practical for use in applications where the moisture removal process may take an extended period of time, as well as other impracticalities.

SUMMARY

In view of the foregoing, the present disclosure describes a new material drying system which may be utilized for effectively removing moisture from a fixed volume of material, such as a grain positioned in a flexible bag located in a farm field.

In one aspect, the present disclosure relates to a material drying apparatus for removing moisture from material positioned in the interior of an envelope having an opening. The material drying apparatus may comprise an inlet structure configured to be in fluid communication with the opening of the envelope and the interior of the envelope. The apparatus may further comprise an air removal assembly configured to remove air from the interior of the envelope when the inlet structure is placed in fluid communication with the opening, and a moisture removal assembly for removing moisture from air removed from the interior of the envelope. The moisture removal assembly may define a fluid path from the inlet structure that is bifurcated into two alternate path portions. The moisture removal assembly comprises a first moisture removal structure for removing moisture from gases moving along a first path portion. The first moisture removal structure comprises a first housing having an interior, a first heat exchanger positioned in the interior of the first housing, a first inlet valve for controlling gas flow into the first housing, and a first outlet valve for controlling gas flow out of the first housing. The moisture removal assembly may comprise a second moisture removal structure for removing moisture from gases moving along a second path portion. The second moisture removal structure comprises a second housing having an interior, a second heat exchanger positioned in the interior of the second housing, a second inlet valve for controlling gas flow into the second housing, and a second outlet valve for controlling gas flow out of the second housing. The assembly may further comprise a heat pump for transferring heat in a selected direction between the first and second moisture removal structures. The heat pump alternately heats the heat exchanger of one of the moisture removal structure and cools the heat exchanger of the other one of the moisture removal structures. The apparatus may also comprise a control apparatus for controlling operation of the first and second moisture removal assemblies and the heat pump, and the control apparatus is configured to sense a condition of the apparatus and reverse operation of the heat pump upon detecting that the condition has passed a predetermined level.

In another aspect, the disclosure relates a system for removing moisture from a material positioned in a substantially air tight envelope. The system may comprise an envelope defining an interior for containing a fixed amount of grain, and the envelope has an opening through which grain is moved into and removed from the interior. The envelope may be formed by a flexible material such that the envelope is supported by the material positioned in the interior of the envelope. The system further comprises a material drying apparatus for removing moisture from material positioned in the interior of an envelope having an opening. The material drying apparatus may comprise an inlet structure configured to be in fluid communication with the opening of the envelope and the interior of the envelope. The apparatus may further comprise an air removal assembly configured to remove air from the interior of the envelope when the inlet structure is placed in fluid communication with the opening, and a moisture removal assembly for removing moisture from gases removed from the interior of the envelope. The moisture removal assembly may define a fluid path from the inlet structure that is bifurcated into two alternate path portions. The moisture removal assembly comprises a first moisture removal structure for removing moisture from gases moving along a first path portion. The first moisture removal structure comprises a first housing having an interior, a first heat exchanger positioned in the interior of the first housing, a first inlet valve for controlling gas flow into the first housing, and a first outlet valve for controlling gas flow out of the first housing. The moisture removal assembly may comprise a second moisture removal structure for removing moisture from gases moving along a second path portion. The second moisture removal structure comprises a second housing having an interior, a second heat exchanger positioned in the interior of the second housing, a second inlet valve for controlling gas flow into the second housing, and a second outlet valve for controlling gas flow out of the second housing. The assembly may further comprise a heat pump for transferring heat in a selected direction between the first and second moisture removal structures. The heat pump alternately heats the heat exchanger of one of the moisture removal structure and cools the heat exchanger of the other one of the moisture removal structures. The apparatus may also comprise a control apparatus for controlling operation of the first and second moisture removal assemblies and the heat pump, and the control apparatus is configured to sense a condition of the apparatus and reverse operation of the heat pump upon detecting that the condition has passed a predetermined level.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, as well as the particulars of any steps of use, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 12B is a schematic flow diagram with continued greater detail regarding some steps of the stop operation process of the illustrative operation.

DETAILED DESCRIPTION

Figure 1:
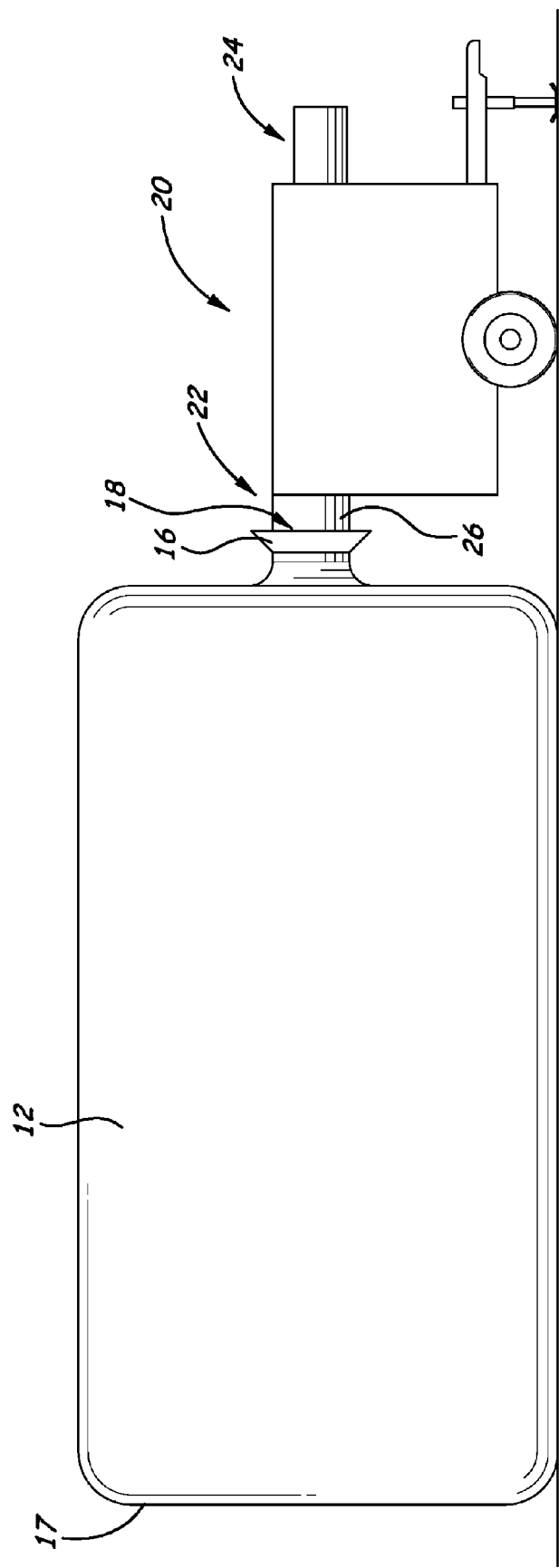
FIG. 1 is a schematic view of a new material drying system according to the present disclosure.
Figure 2:
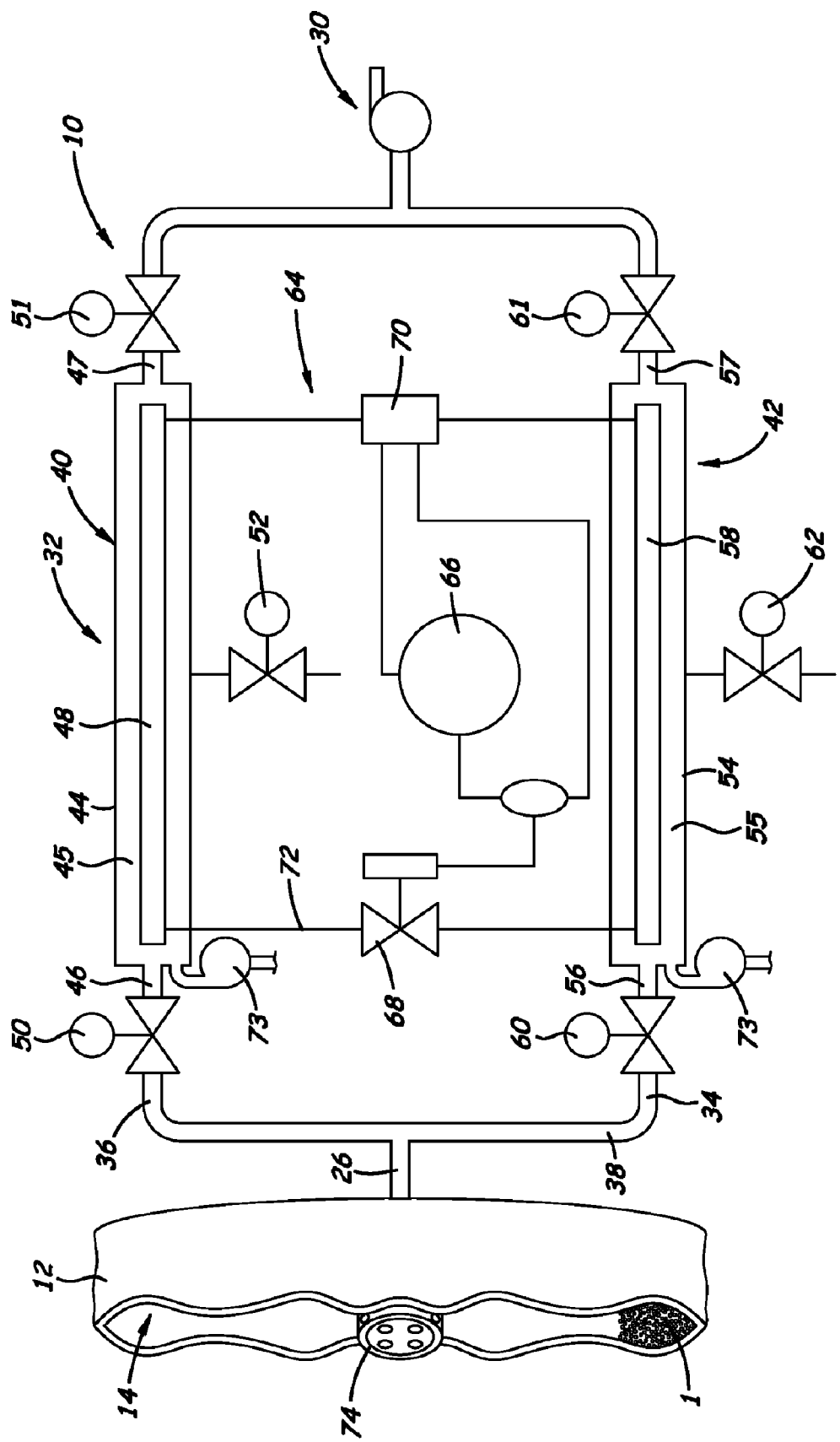
FIG. 2 is a schematic diagram of portion soft hr system, according to an illustrative embodiment.
Figure 3A:
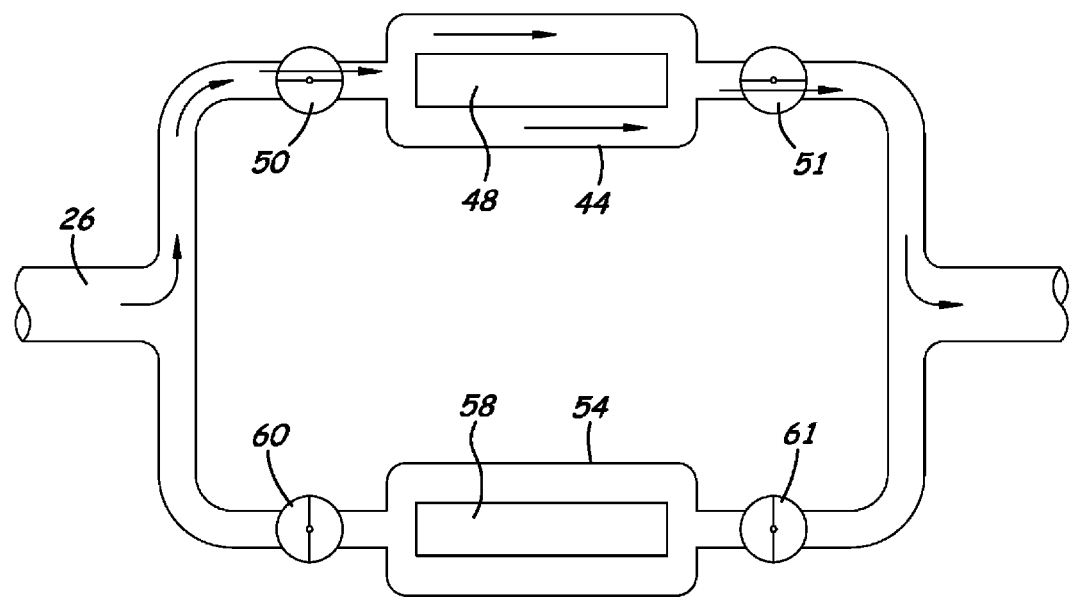
FIG. 3A is a schematic diagram of elements of the moisture removal assembly in a first operational mode, according to an illustrative embodiment.
Figure 3B:
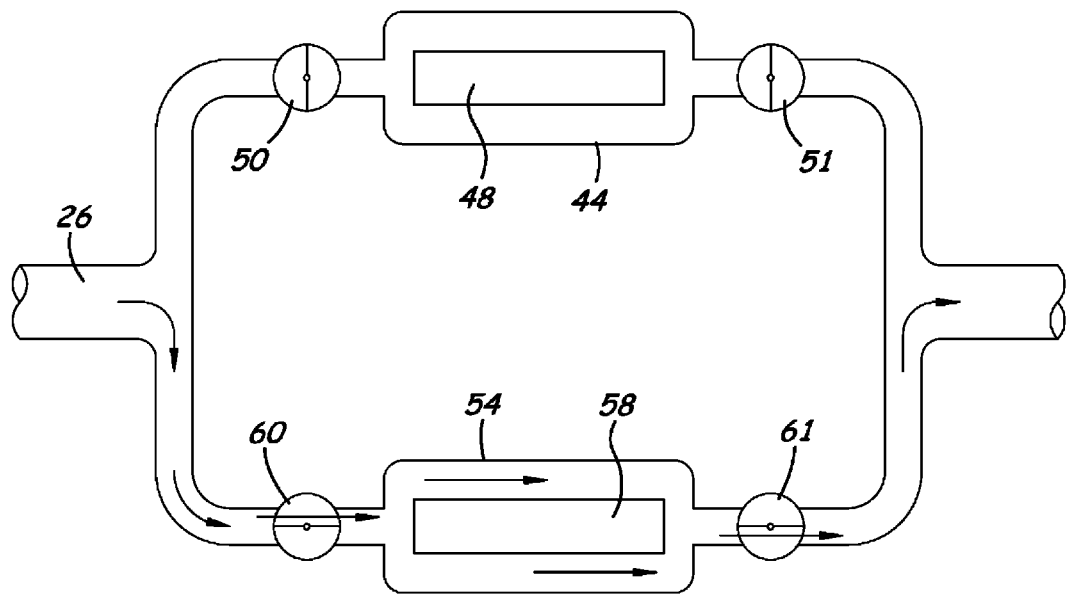
FIG. 3B is a schematic diagram of elements of the moisture removal assembly in a second operational mode, according to an illustrative embodiment.

With reference now to the drawings, and in particular to FIGS. 1 through 12 thereof, a new material drying system embodying the principles and concepts of the disclosed subject matter will be described.

As generally shown in FIGS. 1 through 4 of the drawings, the disclosure relates to a system 10 for removing moisture from a fixed volume of a material 1 positioned in a substantially air tight envelope 12. In the most preferred implementations of the system, the material from moisture is to be removed is a grain that needs to be dried, although those skilled in the art will recognize that the system disclosed herein may be applied to the removal of moisture from a variety of materials that may be positioned in an envelope. The system 10 is highly suitable for drying materials such as grains or crop materials to a degree of approximately 10 to approximately 35 percent moisture, although moisture contents above and below that range may also be achievable using the system. In some embodiments, the system 10 may be portable to be moved between locations such as locations in crop fields where agricultural crops are often temporarily stored in bags. The system 10 may have a form that is towable by a vehicle to be moved between the locations.

In some implementations, the system 10 may include the envelope 12 for containing the material 1 from which moisture is to be removed. The envelope 12 may be elongated with opposite ends, and thus may have a length that is significantly greater in dimension than the width or diameter of the envelope. In some embodiments, the length of the envelope may be between approximately 10 feet and approximately 500 feet, and the width or diameter may be between approximately 2 feet and approximately 30 feet. The envelope 12 defines an interior 14 for containing a fixed amount of the material, such as a grain, between an at least partially open end 16 and a substantially closed end 17. The envelope may be compatible with known grain handling equipment, and has an opening 18 through which grain is moved into, and removed from, the interior 14. The envelope 12 may comprise a bladder formed by a flexible material such that the envelope is substantially incapable of supporting itself, and may be supported by the material 1 positioned in the interior 14 of the envelope. The material of the bladder may comprise a synthetic material with a small coefficient of permeability by air such that the amount of air that is able to move from the environment of the envelope through the wall of the bladder into the interior is minimal if any air is able to move into the interior at all.

The system 10 may also include a material drying apparatus 20 for removing moisture from the material 1 positioned in the interior 14 of the envelope. The moisture removal apparatus 20 may be in fluid communication with the interior 14 of the envelope to be able to draw gases out of the interior. The opening 18 of the envelope 12 may be closed or otherwise functionally blocked by the apparatus 20 such that any air exiting (or entering) the interior 14 must pass through the apparatus 20. The apparatus 20 may include an inlet 22 in fluid communication with the interior 14 of the envelope, and may be in fluid communication with the opening 18 of the envelope. The apparatus may also include an outlet 24 that is generally in communication with the exterior environment of the apparatus 20 and the envelope 12 to exhaust the air passing through the outlet conduit to the environment. The material drying apparatus 20 may also include an inlet conduit 26 that connects the inlet 22 of the material drying apparatus to the opening 18 of the envelope.

The material drying apparatus may further comprise an air removal assembly 30 for removing air from the interior 14 of the envelope. The air removal assembly 30 may be configured to create a low or negative pressure condition in the envelope interior when the inlet 22 of the apparatus 20 is connected to the opening 18, such as through the inlet conduit 26. The air removal assembly 30 may exhaust the air to the outlet 24 of the apparatus 20. In some embodiments, the air removal assembly may comprise a pump capable of moving air from low pressure volumes.

The material drying apparatus 20 may also include a moisture removal assembly 32 for removing moisture from the gases that are removed from the envelope interior 14. The moisture removal assembly 32 may be configured to remove moisture from the air moving out of the interior 14 prior to the air passing through the air removal assembly 30. The moisture removal assembly 32 may define a fluid path 34 from the inlet 22 of the material drying apparatus to the outlet 24. A portion of the fluid path 34 may be bifurcated into two alternate path portions 36 and 38.

The moisture removal assembly 32 may include a first moisture removal structure 40 in communication with the first fluid path portion 36 and a second moisture removal structure 42 in communication with the second fluid path portion 38. The first moisture removal structure 40 defines a section of the first fluid path portion 36, and the second moisture removal structure 42 defines a section of the second air path portion 38. Each of the moisture removal structures 40, 42 is designed to remove moisture from gases passing through the moisture removal assembly 32.

The first moisture removal structure 40 may comprise a first housing 44 having an interior 45 and a first inlet 46 and a first outlet 47. The first moisture removal structure 40 may further comprise a first heat exchanger 48 that is associated with the first housing, and may be positioned in the interior 45 of the first housing 44. The first heat exchanger 48 may be configured such that gases moving along the first path portion passes through the first heat exchanger. The structure 40 may comprise a first inlet valve 50 positioned in the first path portion 36 for controlling gas flow into the first housing 44, and may be positioned adjacent to the first inlet 46 of the first housing. The first moisture removal structure 40 may comprise a first outlet valve 51 positioned in the first path portion 36 for controlling gas flow into the first housing 44. The first outlet valve 51 may be positioned adjacent to the first outlet 47 of the housing. The removal structure 40 may also include a first drain valve 52 in fluid communication with the interior 45 of the first housing for permitting liquid to drain from the interior of the first housing.

Similarly, the second moisture removal structure 42 may comprise a second housing 54 having an interior 55 and a second inlet 56 and a second outlet 57. The second moisture removal structure 42 may further comprise a second heat exchanger 58 that is associated with the second housing, and may be positioned in the interior 55 of the second housing 54. The second heat exchanger 58 may be configured such that gases moving along the second path portion 38 passes through the second heat exchanger. The structure 42 may comprise a second inlet valve 60 positioned in the second path portion 38 for controlling gas flow into the second housing 54, and may be positioned adjacent to the second inlet 56 of the second housing. The second moisture removal structure 42 may comprise a second outlet valve 61 positioned in the second path portion 38 for controlling gas flow into the second housing 54. The second outlet valve 61 may be positioned adjacent to the second outlet 57 of the housing. The removal structure 42 may also include a second drain valve 62 in fluid communication with the interior 55 of the second housing for permitting liquid to drain from the interior of the second housing.

In some implementations of the system 10, each of the moisture removal structures 40, 42 includes a vapor-liquid separator, or "knock out pot", to form at least a portion of elements of the moisture removal structures 40, 42.

The moisture removal assembly 30 may further include a heat pump structure 64 for transferring heat in a selected direction between the first 40 and second 42 moisture removal structures. The heat pump structure 64 may alternately heat the heat exchanger in one of the moisture removal structures 40, 42 and cool the heat exchanger in the other one of the moisture removal structures 40, 42. The heat pump structure 64 may be used to alternately operate the heat exchanger of one moisture removal structure as a condenser to remove moisture from the air moving along the air path from the envelope interior, and simultaneously operate the heat exchanger of the other moisture removal structure as an evaporator to act as a heat sink and also remove any moisture that has accumulated on the exterior of the heat exchanger as a result of previously acting as a condenser removing moisture from the air flow on the air path.

In greater detail, the heat pump structure 64 may comprise a compressor 66, an expansion valve(s) 68, a reversing valve 70, and a plurality of conduits 72 connecting the compressor, the expansion valve(s), and the reversing valve to the first heat exchanger 48 and the second heat exchanger 58 in a manner such that the working fluid of the heat pump structure 64 may be supplied to the first and second heat exchangers 48, 58 in reversible directions to permit each of the heat exchangers to act as a condenser or an evaporator.

The moisture removal assembly 32 of the system 10 may include an auxiliary defrosting assembly 73 for facilitating the removal of accumulated moisture, generally in the form of frozen moisture or frost, from the heat exchanger of the moisture removal structure that has previously acted as an evaporator and accumulated the moisture on the exterior surfaces of the heat exchanger, and is presently acting as an evaporator. The heating of the surfaces of the heat exchanger tends to thaw the frozen moisture and thus cause the moisture to leave the exterior surface of the heat exchanger. In some embodiments, the auxiliary defrosting assembly 73, such as an auxiliary fan or blower, may be employed to enhance the removal of the moisture from the heat exchanger while the heat exchanger is functioning as an evaporator by causing an air flow over the exterior of the heat exchanger. The auxiliary fan 73 associated with a particular moisture removal structure may be turned on when the operation of the heat pump structure is reversed to cause the heat exchanger of the particular moisture removal structure to operate as an evaporator.

In some implementations, the system 10 may include a perforated tube 74 that is positionable in the interior 14 of the envelope, and preferably at a substantially central location of the material placed in the interior, to facilitate more uniform removal of gases and vapor from the interior 14. The perforated tube 74 may extend approximately from the closed end to the open end of the envelope, although the tube need not extend the entire distance between the ends. The perforated tube 74 may have a perimeter wall, with a plurality of holes in the perimeter wall of the tube, so that gases are able to enter the interior of the tube at points between the ends of the tube. The perforated tube 74 may be connected in fluid communication with the inlet conduit 26 of the material drying apparatus, either directly to the inlet conduit or indirectly when the tube and the conduit 26 are not directly connected but are spaced from each other without significant distance therebetween.

Figure 4:
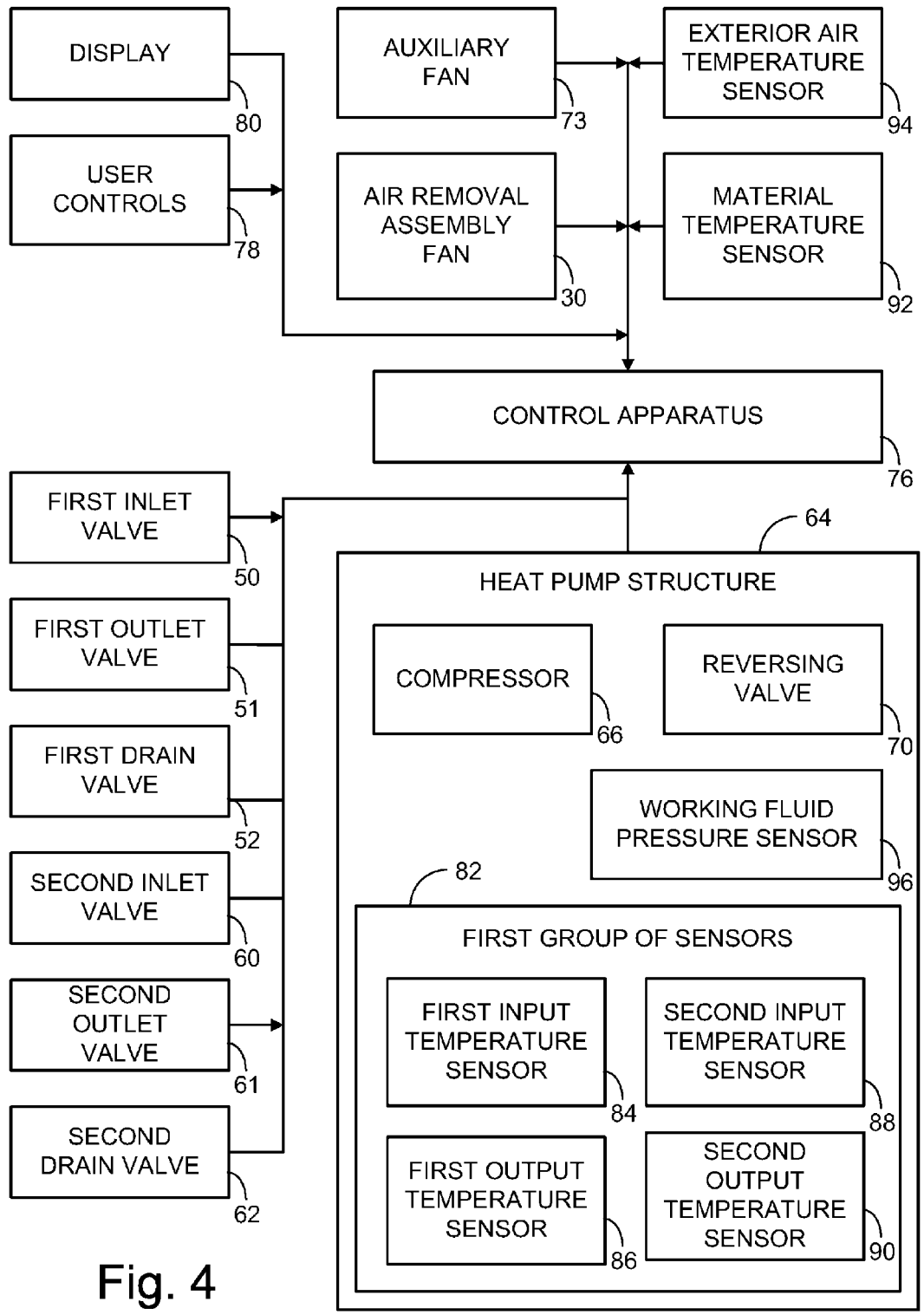
FIG. 4 is a schematic diagram of the elements of the material drying apparatus, according to an illustrative embodiment.

Significantly, the system 10 may also include a control apparatus 76 for controlling the operation of various elements of the system to cause a drying process to be performed on the material 1 positioned in the envelope interior 14, elements of which are generally shown in FIG. 4. The function of the control apparatus may permit the system to operate with little or no human intervention for extended periods of time, allowing the drying process to be conducted over a relatively long period of storage. The control apparatus 76 may comprise a processor with suitable instructions stored in memory for operating the processor, and the elements connected to the processor, in the manner described herein. For example, a programmable logic controller may be utilized. The control apparatus 76 may also include a control panel or other structure with a plurality of user-actuated controls 78 and a display 80 that displays information to the user or operator.

The system may also include a plurality of sensors that sense or detect various conditions of elements of the system or conditions of the environment of the system. The sensors may be communicatively connected to the control apparatus 76 to provide information to the control apparatus for controlling operation of the system. A first group 82 of sensors may be employed to detect the temperature conditions of the heat pump structure 64. The sensors of the first group 82 may be located at various points along the conduits 72 that carry the working fluid of the heat pump structure 64 to determine the operating conditions of the pump structure 64. Illustratively, a sensor 84 of the first group 82 may be located on the conduit connecting the compressor 66 to the input end of the first heat exchanger 48 and a sensor 86 may be located on the conduit connecting the output end of the first heat exchanger to the compressor. Similarly, a sensor 88 of the first group 82 may be located on the conduit connecting the compressor 66 to the input end of the second heat exchanger 58 and a sensor 90 may be located on the conduit connecting the output end of the second heat exchanger to the compressor. The control apparatus 76 may be able to determine temperature drops in the working fluid of the heat pump structure using inputs from the first group of sensors.

Another sensor 92 may be configured to sense the temperature of the material positioned in the interior of the envelope, and this material temperature sensor 92 may be adapted to be positioned in the mass of the material for communicating to the detected temperature to the control apparatus 76. Still another sensor 94 may be configured to sense the temperature of the air exterior to the envelope, and the air temperature sensor 94 may be positioned on an exterior surface of the control apparatus, or at a location that permits air from the exterior to reach the sensor 94 so that the sensor accurately detects the exterior temperature.

Additionally, one or more sensors may be employed to sense other factors or conditions that may affect the performance of the system, such as, for example, the pressures of the working fluid in the conduits 72 of the heat pump structure may be sensed by pressure sensors 96 that may be monitored to sensed pressures that are too low or too high for continued safe operation of the system.

The control apparatus 76 may utilize a plurality of processes to operate the system 10 to remove moisture from the gases being removed from the envelope interior, and thereby remove moisture from the material in the interior.

Figure 5A:
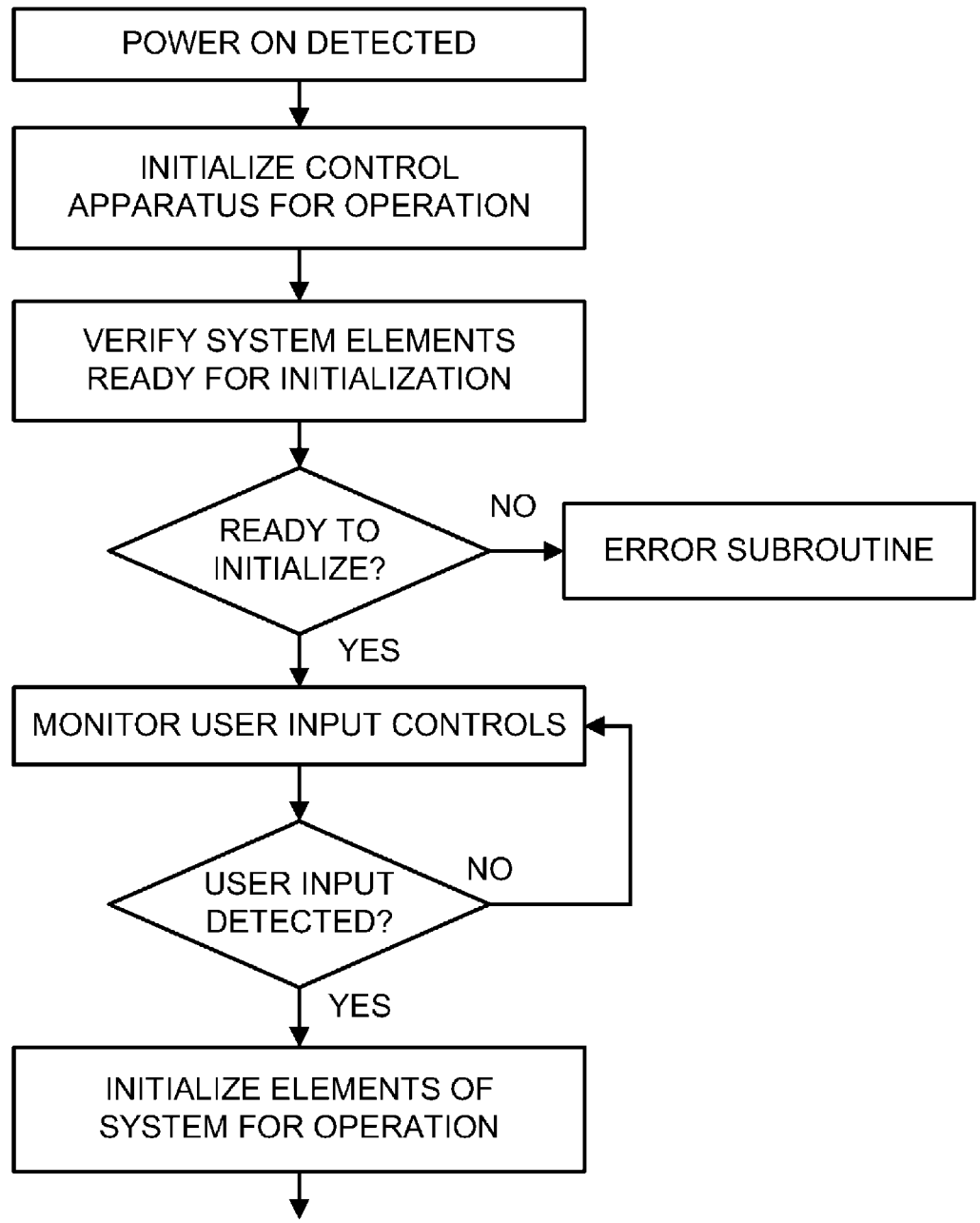
FIG. 5A is a schematic flow diagram of a first portion of an illustrative operation process for the system.
Figure 5B:
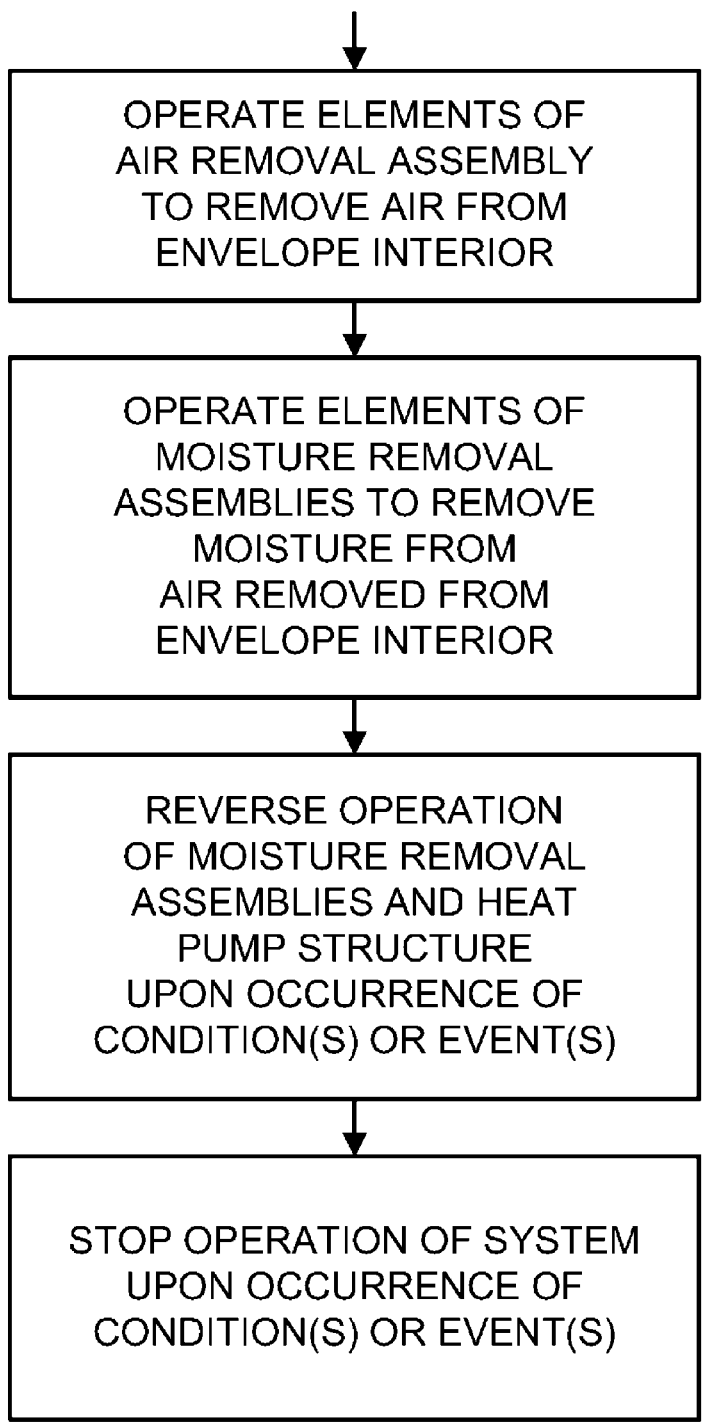
FIG. 5B is a schematic flow diagram of a second portion of the illustrative operation process for the system.
Figure 6:
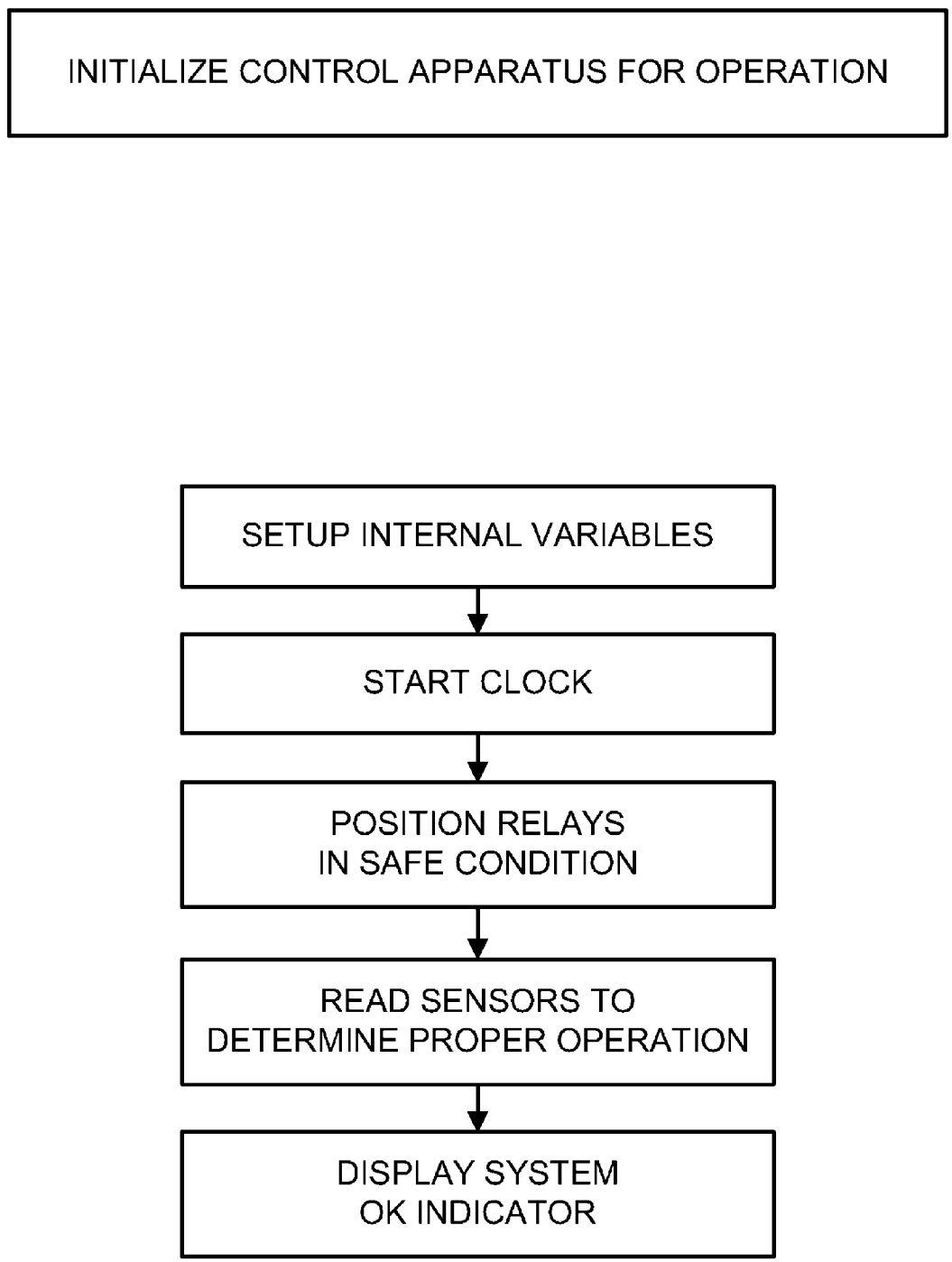
FIG. 6 is a schematic flow diagram with greater detail regarding the control initialization process of the illustrative operation.
Figure 7:
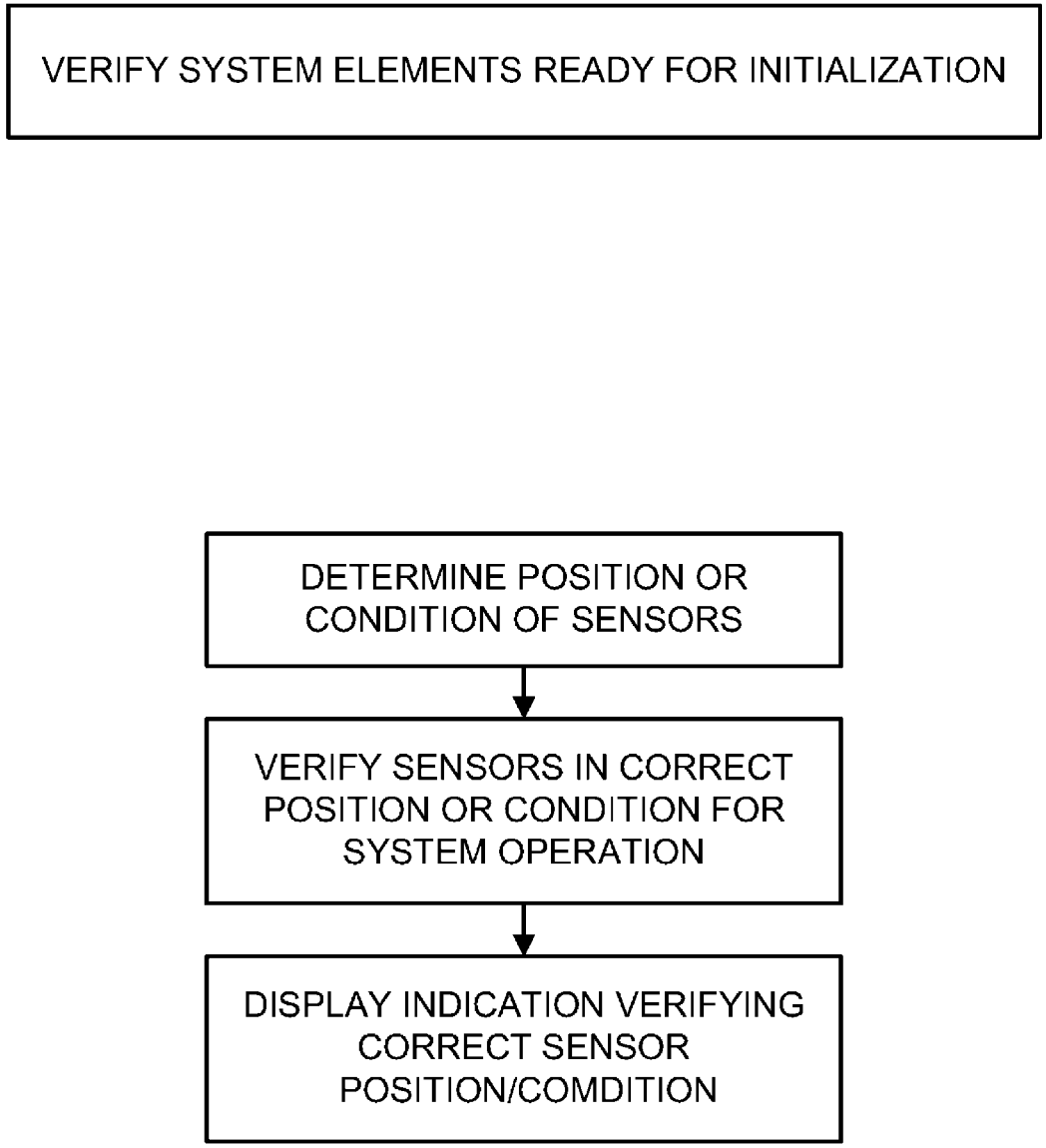
FIG. 7 is a schematic flow diagram with greater detail regarding the element verification process of the illustrative operation.

In an exemplary power-on or start up process, such as is depicted ion FIGS. 5A and 5B, the control apparatus 76 may recognize reception of a power-on command from one of the controls 78 or other input. The elements of the control apparatus may be energized with power, and an initialization procedure of the control apparatus may be begun, The initialization process, an example of which is depicted in FIG. 6, may include steps such as, for example, reading the storage or memory associated with the apparatus 76, starting a clock or timer circuit, energizing the display 80, placing relays of the system in a safe condition or position, reading the sensors and evaluating sensor operability or inoperability based upon the readings, and indicating system operation is "OK" to the user such as via the display.

Turning back to FIG. 5A, a process for verifying the readiness of the system elements for initialization may be performed. As shown in greater detail in FIG. 7, the process may include determining and verifying the correct positioning of the sensors by determining if the levels of the respective outputs or signals from the sensors fall within a pre-specified range of output levels that are appropriate for the startup of the system 10, and the result of the check may be indicated on the display to indicate the readiness of the system for operation.

Figure 8:
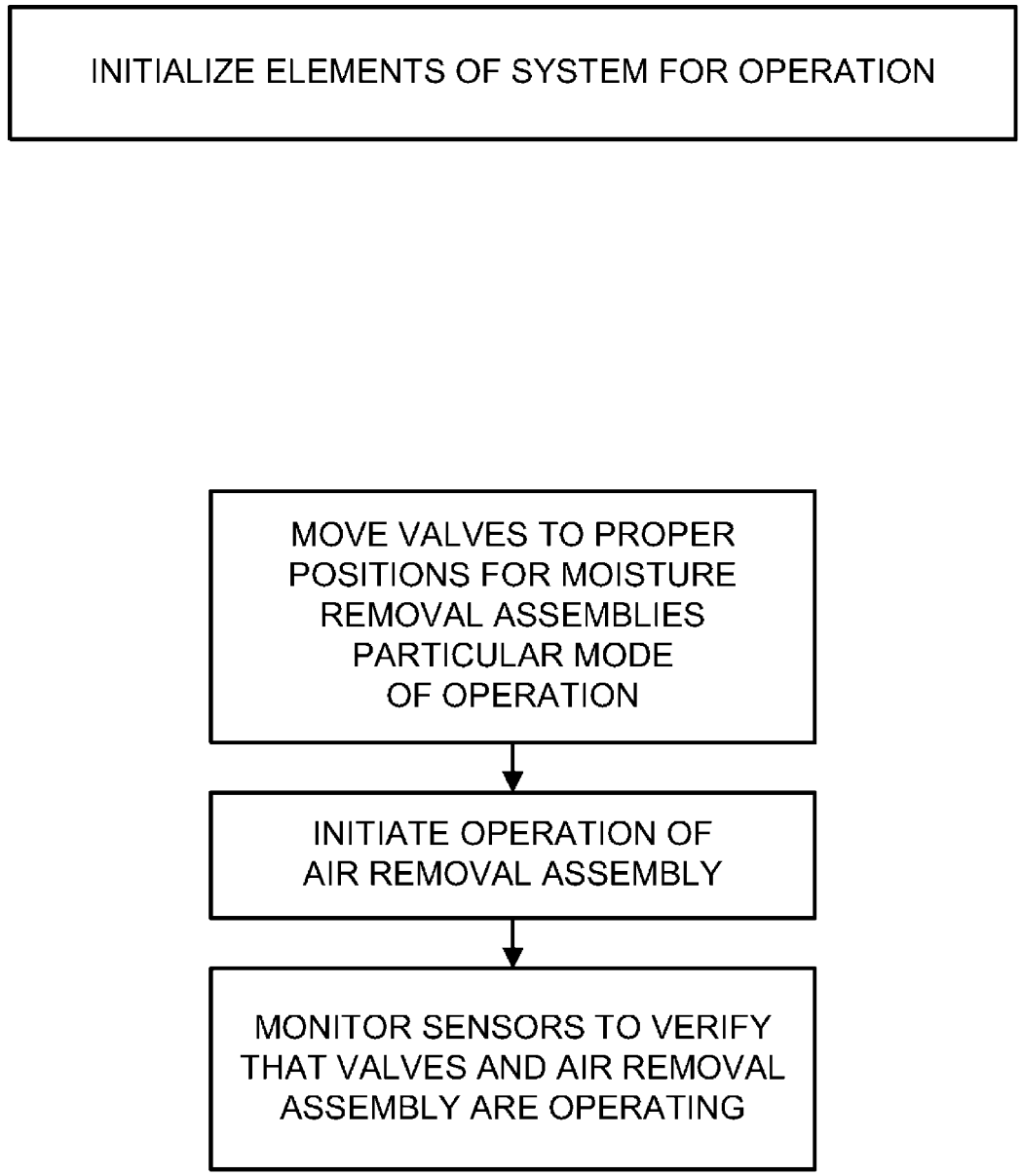
FIG. 8 is a schematic flow diagram with greater detail regarding the element initialization process of the illustrative operation.
Figure 9:
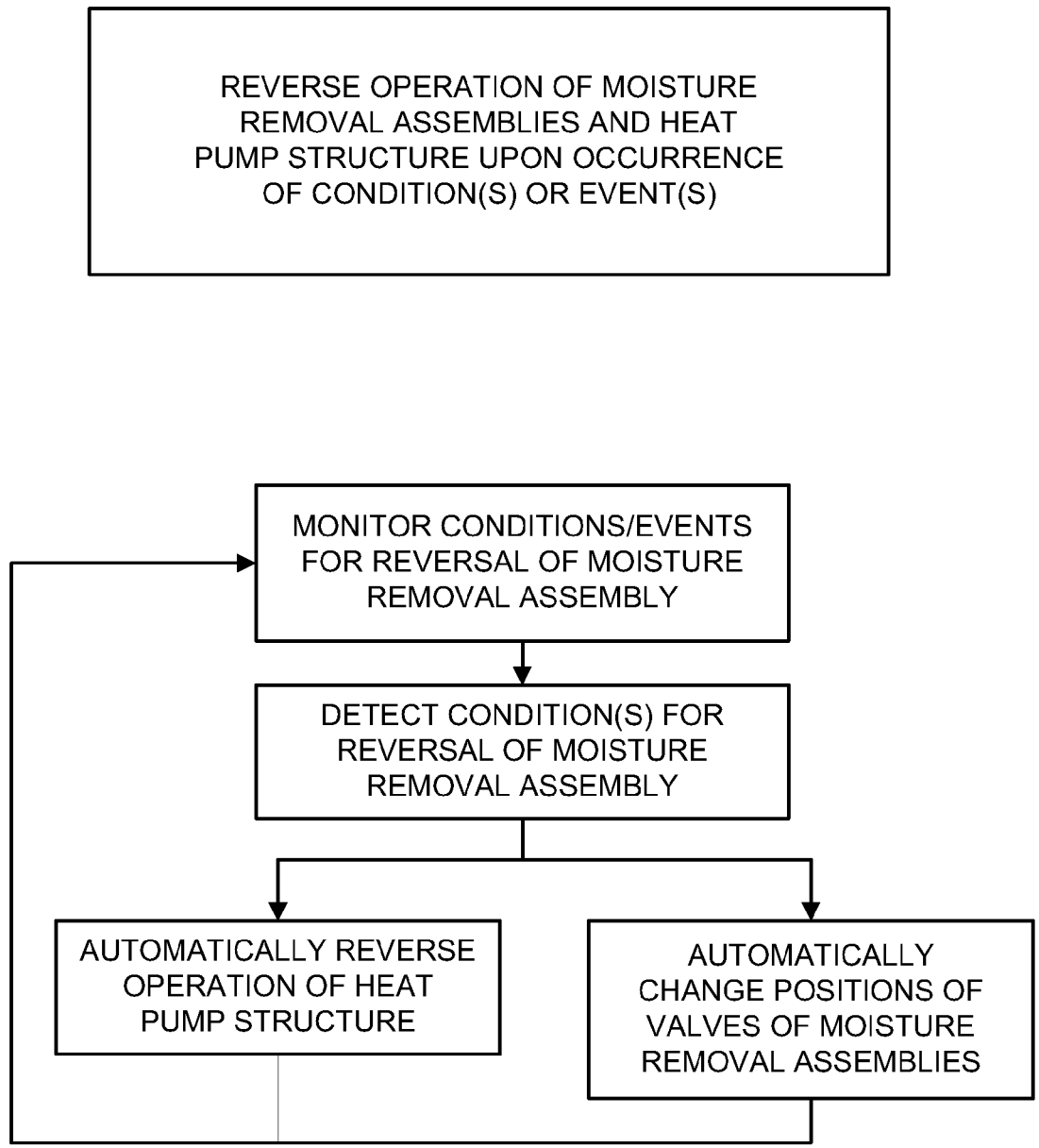
FIG. 9 is a schematic flow diagram with greater detail regarding the reverse operation process of the illustrative operation.

When the control apparatus detects user input to initiate the drying process (see FIG. 5A), the apparatus 76 may initialize the elements of the system for operation of, for example, the air removal assembly 30, and the moisture removal assembly 32. As shown in FIG. 8, the process may comprise opening the first inlet valve 50 and the first outlet valve 51, and closing the second inlet valve 60 and may also include the second outlet valve 61, all of which may occur prior to the beginning of operation of the air removal assembly. Operation of the moisture removal assembly 32 may include operating the heat pump structure 64 such that the first heat exchanger 48 of the first moisture removal structure functions as an evaporator and the second heat exchanger 58 of the second moisture removal structure functions as a condenser. Those skilled in the art will recognize that operation of the system may be initiated with the second heat exchanger acting as the evaporator and the first heat exchanger as the condenser, and that the foregoing description of the positions and conditions of the valves, etc. would then be reversed.

Looking back to FIG. 5B, after operation of the system in the foregoing manner has occurred, a condition may be detected that triggers or calls for the reversal of the operation of the moisture removal assembly 32. The condition may be selected by the user through the controls or programming of the control apparatus, or a particular condition may be permanently set for the system. As shown in some detail in FIG. 9 and in greater detail in FIGS. 10A and 10B, one triggering condition may be the detection of the passage of a predetermined period of time, such as the passage of a predetermined time period since the beginning of the initiation of the drying process when the air removal 30 and moisture removal 32 assemblies. In such implementations, the length of time since a start time of the drying process may be monitored. If it is detected that the time since beginning the process is approximately equal to or greater than the predetermined period of time, the control apparatus 76 may initiate a reversal of the operation of the heat pump structure.

Another triggering condition may be the detection that a rate of change of the pressure of the working fluid in the heat pump is less than a predetermined level for the rate of change. This condition may indicate that the evaporator has or becoming covered with condensed moisture in the form of ice or ice crystals. The buildup of frozen condensate on the heat exchanger acting an evaporator tends to reduce the efficiency of the moisture removal, and the change in pressure is affected by this accumulation of frozen moisture. In such implementations, the control apparatus 76 may sense the pressure of the working fluid in the heat pump structure using the working fluid pressure sensor 96, and may determine a rate of change for the sensed fluid pressure. If it is detected that the rate of change for the sensed fluid pressure is less than the predetermined level for the rate of change, the apparatus 76, the control apparatus 76 may initiate a reversal of the operation of the heat pump structure.

Yet another triggering condition may be the detection that the pressure of the working fluid in the heat pump structure is less than a first predetermined level or greater than a second predetermined level, which may also indicate that an accumulation of frozen moisture is present on the heat exchanger acting as the evaporator. In such implementations, the control apparatus 76 may sense the pressure of the working fluid in the heat pump structure at the pressure sensor 96, and if it is detected that the pressure is less than the first predetermined level or greater than the second predetermined level, the control apparatus may initiate a reversal of the operation of the heat pump structure. Another triggering condition may be the detection of a temperature of the working fluid of the heat pump structure that is above a predetermined threshold temperature. Further, a temperature differential between the input and output of one of the heat exchangers may be monitored, and a temperature differential between the heat exchangers of the first and second moisture removal assemblies may be monitored and may trigger a change if the differential is greater than a predetermined difference or less than a predetermined difference.

Figure 10A:
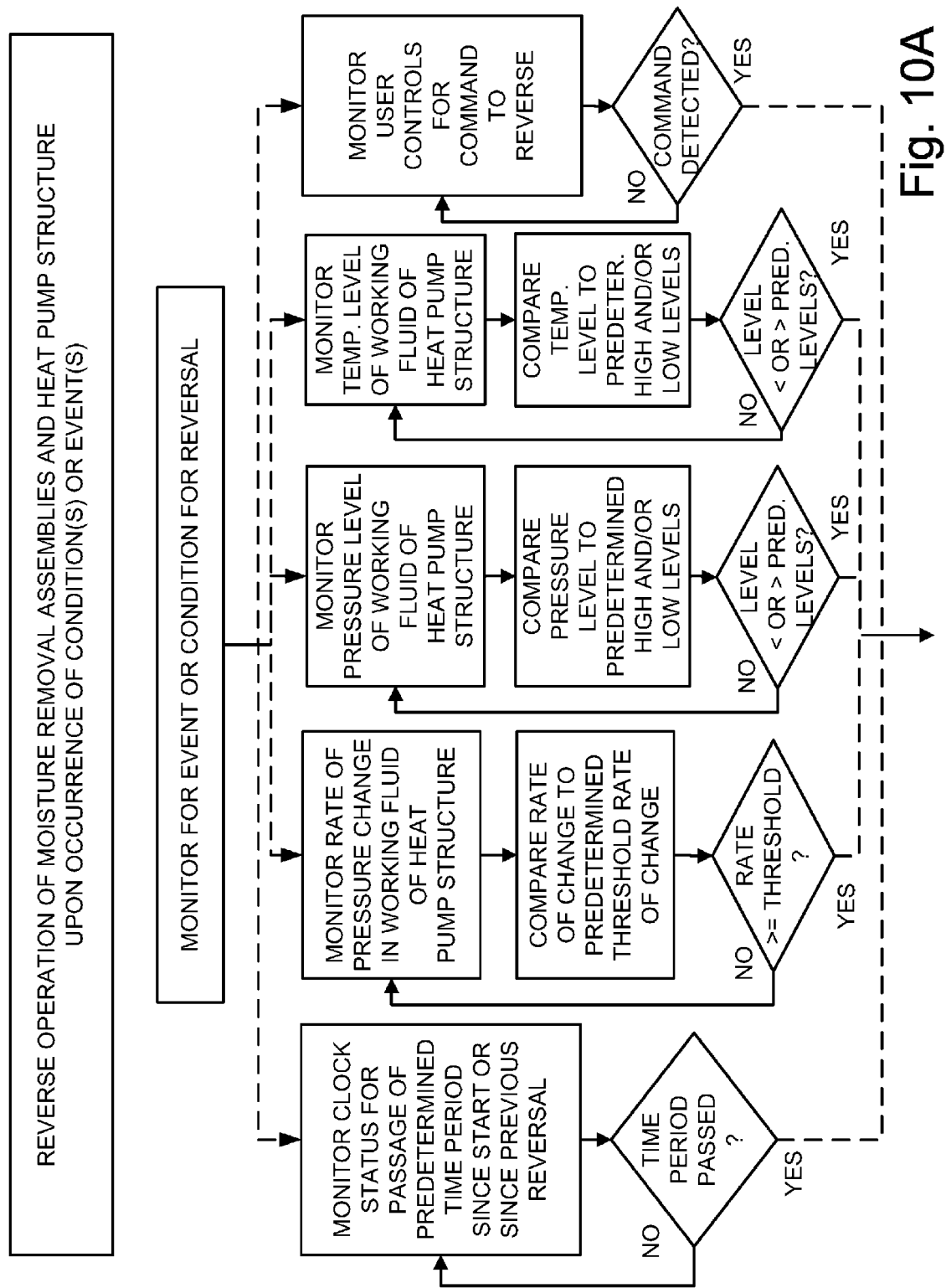
FIG. 10A is a schematic flow diagram with greater detail regarding some steps of the reverse operation process of the illustrative operation.
Figure 10B:
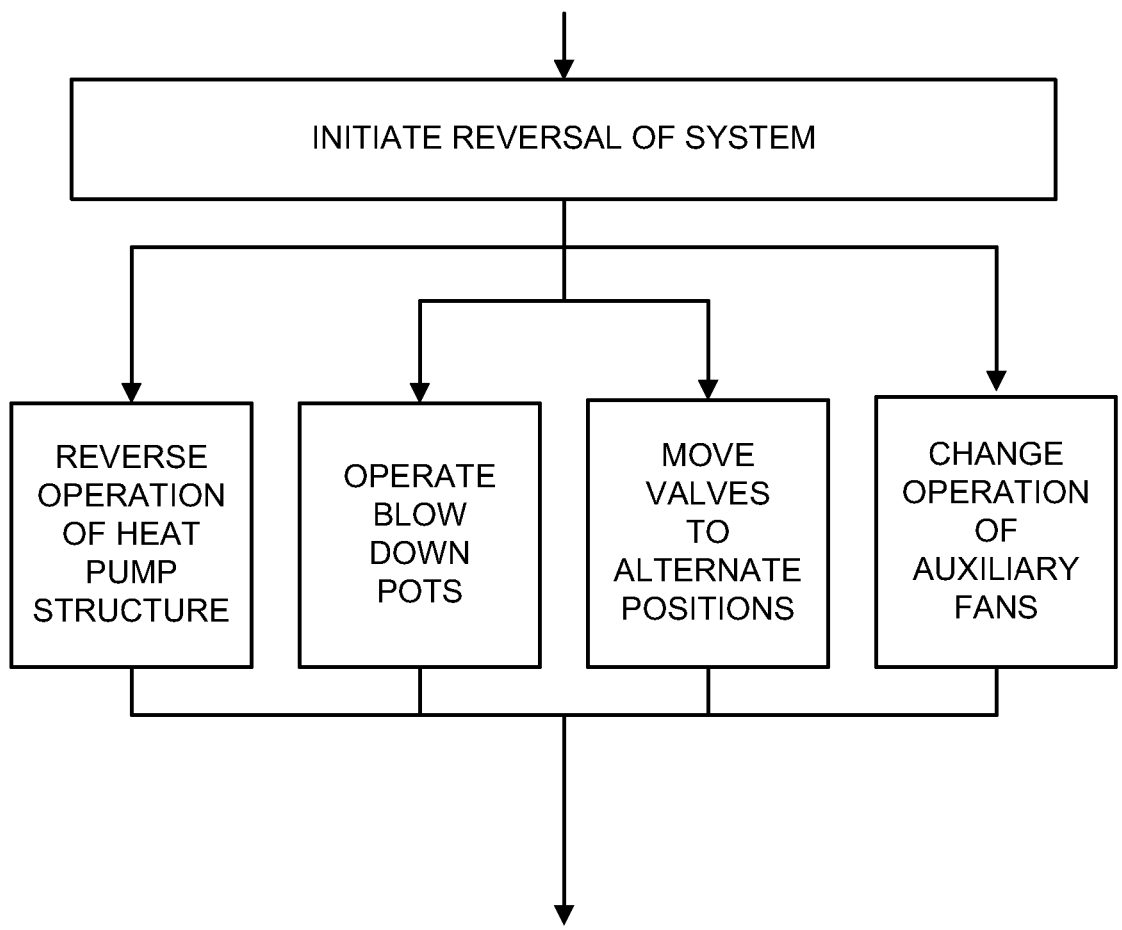
FIG. 10B is a schematic flow diagram with continued greater detail regarding some steps of the reverse operation process of the illustrative operation.

As depicted in FIG. 10B, upon the detection of one of these conditions, or another suitable condition, operation of the moisture removal assembly 32 may be reversed by, for example, reversing operation of heat pump structure 64 such that the heat exchanger functioning as the evaporator now begins to operate as the condenser, and the heat exchanger operating as the condenser now begins to operate as the evaporator. At substantially the same time as the reversal of the heat pump operation, or somewhat before or after the reversal, the inlet and outlet valves for the moisture removal structure that were previously closed (and that are associated with the heat exchanger that previous to the reversal operated as the condenser) are opened, and the inlet valve that is associated with the heat exchanger previously acting as the evaporator is closed. Also, the outlet valve associated with the previous evaporator heat exchanger may be closed. Further, the operation of the auxiliary fans, if employed, may be changed so that the fan associated with the heat exchanger now acting as a condenser is activated and the auxiliary fan associated with the exchanger now acting as an evaporator may be deactivated.

Figure 11:
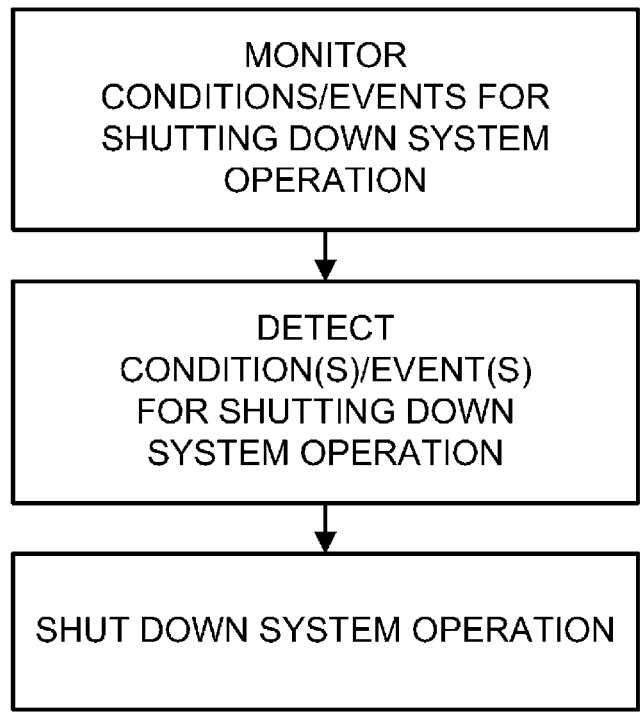
FIG. 11 is a schematic flow diagram with greater detail regarding the stop operation process of the illustrative operation.
Figure 12A:
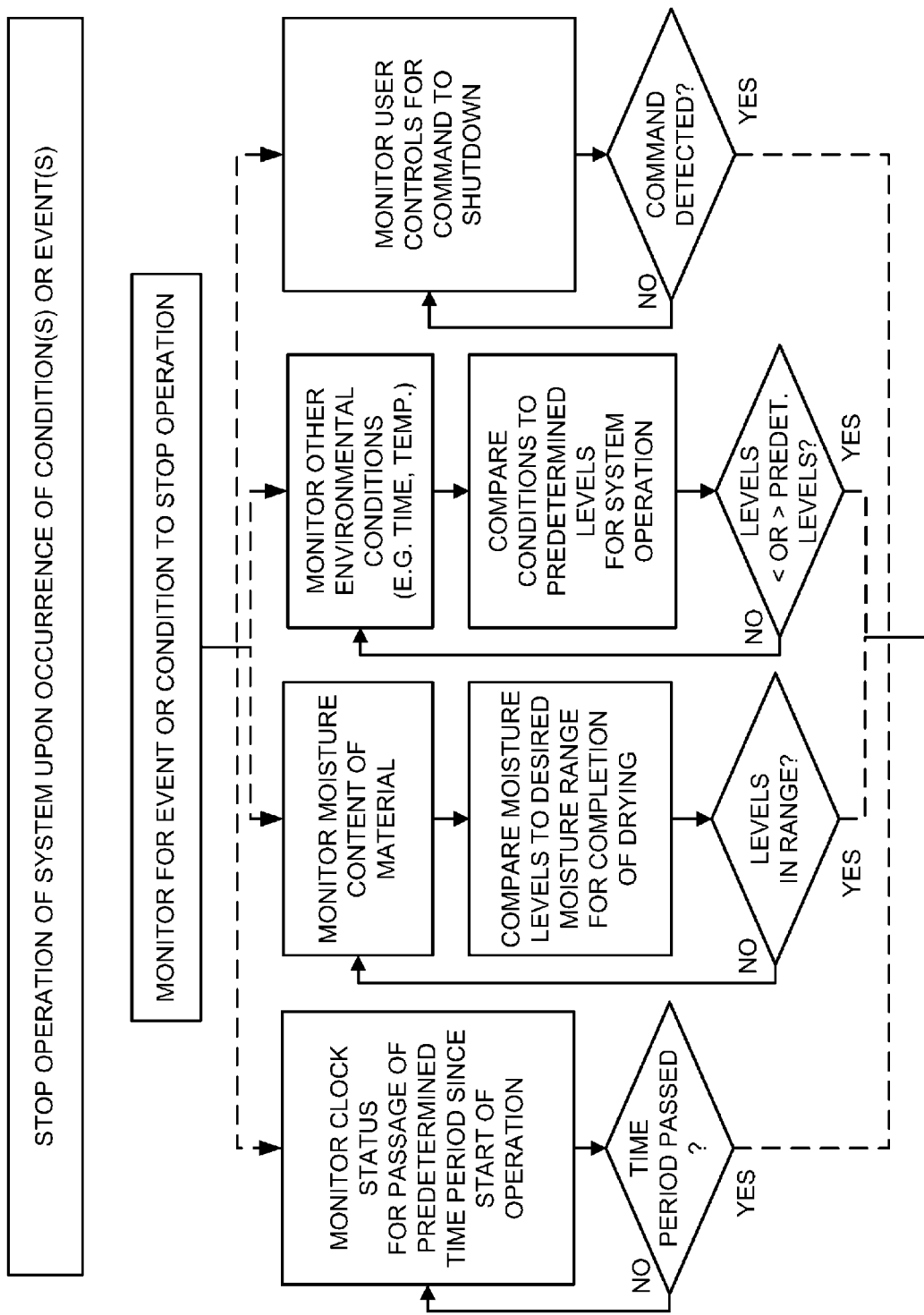
FIG. 12A is a schematic flow diagram with greater detail regarding some steps of the stop operation process of the illustrative operation.

Looking back to FIG. 5B, the control apparatus 76 may also discontinue the operation of the system 10 upon the occurrence or detection of an event or condition. As shown in FIG. 11, and in greater detail in FIGS. 12A and 12B, for example, the event may be the passage of a predetermined period of time since the initiation of operation of the system without interruption. As another example, the event may be the detection that the moisture level of the material in the envelope interior is detected to be less than a predetermined moisture level (which may be determined by detecting a moisture level of the gases being removed from the interior or the failure of moisture to continue to accumulate on the surfaces of the heat exchangers. As yet another example, the event or condition may be the detection that one or more ambient conditions are no longer present. The ambient conditions may be the ambient air temperature about the system 10, or the ambient condition may be the time of day.

The process of discontinuing operation of the system 10 may include stopping operation of the heat pump structure 64, stopping operation of the air removal assembly 30 (see FIG. 12B), and positioning the valves in a condition suitable for shutdown, such as a closed condition, to maintain at a partial vacuum in the envelope interior. Additionally, and optionally, the control apparatus 70 may trigger one or more devices that provide audible and/or visual alerts to provide a warning to an operator of the apparatus of a hazardous or damaging condition of the apparatus or of the material. The control apparatus, through the display 80, may also provide the operator with information regarding the status of the apparatus operation and the progress of the drying operation on the material. The control apparatus 70 may also be configured to permit fully manual operation, fully automatic operation, or a hybrid mode in which some controls are automatic and some controls are manual.

In general, the control apparatus 76 of the system 10 may be utilized to monitor the drying process and control the activation and deactivation of the first 40 and second 42 moisture removal structures in an alternating manner. After a period of operation, the rate of heat transfer for the evaporator heat exchanger of the active moisture removal structure will decline due to ice blanketing on the surface of the heat exchanger. The ice blanketing condition may be detected by the control apparatus by sensing and analyzing pressures, temperatures, rate of change of either pressure or temperature, or elapsed time. The control apparatus may operate isolating valves, reversal valves and/or other appropriate mechanical devices in a suitable order to isolate and thus deactivate the moisture removal structure currently acting as a condensation vessel, and activate the other moisture removal structure to function as the condensation vessel. Condensation will accumulate on the evaporator heat exchanger of the newly active moisture removal structure, and the heat from the heat pump is dumped to melt the ice blanket on the condenser heat exchanger of the newly isolated vessel. The drain valve on the housing may be opened by the control apparatus to allow captured water to be removed and optionally may allow metering of the amount of water removed.

During operation of the system 10, the pump of the air removal assembly 30 draws air out of the interior 14 of the envelope through the active moisture removal structure that is in fluid communication with the interior of the envelope, which will initially reduce or decrease the pressure of the air within the envelope interior. As the pressure in the envelope interior decreases, moisture from within the grain will begin to flash to vapor. As this vaporization occurs, remaining moisture in the grain may cool to the point of solidification to cause freezing of some of the moisture inside the grain. The material drying apparatus 20 creates a pressure gradient in the envelope interior 14 that draws the vapor towards and through the apparatus 20. While the heat pump structure is cooling the evaporator heat exchanger in the housing subjected to the vacuum caused by the air removal assembly 30 (to thereby condense the vapor from the gases being drawn through the material drying apparatus 20 toward the air removal pump 30, the heat extracted by the heat pump structure is used to heat the condenser heat exchanger located in the housing that is isolated from the gases flowing out of the envelope. As the gases and vapor proceed toward the pump 30 and pass through the activated moisture removal structure, the moisture condenses on the evaporator heat exchanger and may blanket surfaces of the heat exchanger or may fall to the bottom of the housing as a sub-cooled liquid, where it will eventually freeze.

Solar energy radiation, and heat transfer from a relatively higher ambient air temperature outside of the envelope, into the closed system is utilized to heat the material in the envelope and vaporize moisture frozen inside the material. Due to the low pressure condition created in the envelope interior, a lower temperature is required to reach vaporization. The system 10 can thus be more cost effective to operate as it utilizes solar energy instead of a fuel to heat the material.

Further, the material drying apparatus 20 may easily be made portable and thus can be more easily transported to the location of a grain harvest, rather than requiring transport of the grain to a bin location before drying may begin. The system 10 may also reduce the use of external bins and augers or other fixed systems, and enhance the use of synthetic envelopes that may be placed anywhere and disposed of after use.

The system 10 may also require less supervision than conventional heat-based drying systems, and thus may be safer due to the lack of a combustion source that might ignite a fire.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A material drying apparatus for removing moisture from material positioned in the interior of an envelope, the envelope having an opening, the material drying apparatus comprising:
   an inlet structure configured to be in fluid communication with the opening of the envelope and the interior of the envelope;
   an air removal assembly configured to remove air from the interior of the envelope when the inlet structure is placed in fluid communication with the opening;
   a moisture removal assembly for removing moisture from gases removed from the interior of the envelope, the moisture removal assembly defining a fluid path from the inlet structure that is bifurcated into two alternate path portions, the moisture removal assembly comprising:
      a first moisture removal structure for removing moisture from gases moving along a first path portion, the first moisture removal structure comprising a first housing having an interior, a first heat exchanger positioned in the interior of the first housing, a first inlet valve for controlling gas flow into the first housing, a first outlet valve for controlling gas flow out of the first housing;
      a second moisture removal structure for removing moisture from gases moving along a second path portion, the second moisture removal structure comprising a second housing having an interior, a second heat exchanger positioned in the interior of the second housing, a second inlet valve for controlling gas flow into the second housing, a second outlet valve for controlling gas flow out of the second housing; and
      a heat pump for transferring heat in a selected direction between the first and second moisture removal structures, the heat pump alternately heating the heat exchanger of one of the moisture removal structure and cooling the heat exchanger of the other one of the moisture removal structures;
   a control apparatus for controlling operation of the first and second moisture removal assemblies and the heat pump, the control apparatus being configured to sense a condition of the apparatus and reverse operation of the heat pump upon detecting that the condition has passed a predetermined level.

2. The apparatus of claim 1 wherein the condition sensed by the control apparatus is a time of operation of the apparatus, and wherein the predetermined level of the condition comprises a predetermined period of time.

3. The apparatus of claim 1 wherein the condition sensed by the control apparatus is pressure of a working fluid of the heat pump, and wherein the predetermined level of the condition comprises a pressure that is greater than a predetermined level of pressure.

4. The apparatus of claim 1 wherein the condition sensed by the control apparatus is temperature of a working fluid of the heat pump, and wherein the predetermined level of the condition comprises a temperature that is greater than a predetermined temperature level.

5. The apparatus of claim 1 wherein the condition sensed by the control apparatus is pressure of a working fluid of the heat pump, and wherein the predetermined level of the condition comprises a pressure that is less than a predetermined level of pressure.

6. The apparatus of claim 1 wherein the condition sensed by the control apparatus is a rate of change in pressure of a working fluid of the heat pump, and wherein the predetermined level of the condition comprises a rate of change in pressure that is greater than a predetermined rate of pressure change.

7. The apparatus of claim 1 wherein the control apparatus is configured to sense a condition of the apparatus and discontinue operation of the apparatus upon detecting that the condition has passed a predetermined level.

8. The apparatus of claim 1 wherein the condition sensed by the control apparatus is a time of operation of the apparatus, and wherein the predetermined level of the condition comprises a predetermined period of time.

9. The apparatus of claim 1 wherein the condition sensed by the control apparatus is a moisture level of a material being dried in the envelope, and wherein the predetermined level of the condition comprises a moisture level of the material that is less than a predetermined moisture level.

10. The apparatus of claim 1 wherein the condition sensed by the control apparatus is an ambient temperature, and wherein the predetermined level of the condition comprises an ambient temperature level that is less than a predetermined temperature level.

11. The apparatus of claim 1 additionally comprising a perforated tube positionable in the interior of the envelope, the perforated tube being in fluid communication with the inlet structure.

12. A system for removing moisture from a material positioned in a substantially air tight envelope, the system comprising:

an envelope defining an interior for containing a fixed amount of grain, the envelope having an opening through which grain is moved into and removed from the interior, the envelope being formed by a flexible material such that the envelope is supported by the material positioned in the interior of the envelope;

a material drying apparatus for removing moisture from material positioned in the interior of the envelope, the material drying apparatus being in fluid communication with the interior of the envelope, the opening of the envelope being closed by the apparatus, the material drying apparatus comprising:

an inlet structure configured to be in fluid communication with the opening of the envelope and the interior of the envelope;

an air removal assembly configured to remove air from the interior of the envelope when the inlet structure is placed in fluid communication with the opening;

a moisture removal assembly for removing moisture from gas removed from the interior of the envelope, the moisture removal assembly defining a fluid path from the inlet structure that is bifurcated into two alternate path portions, the moisture removal assembly comprising:

a first moisture removal structure for removing moisture from gases moving along a first path portion, the first moisture removal structure comprising a first housing having an interior, a first heat exchanger positioned in the interior of the first housing, a first inlet valve for controlling gas flow into the first housing, a first outlet valve for controlling gas flow out of the first housing;

a second moisture removal structure for removing moisture from gases moving along a second path portion, the second moisture removal structure comprising a second housing having an interior, a second heat exchanger positioned in the interior of the second housing, a second inlet valve for controlling gas flow into the second housing, a second outlet valve for controlling gas flow out of the second housing; and a heat pump for transferring heat in a selected direction between the first and second moisture removal structures, the heat pump alternately heating the heat exchanger of one of the moisture removal structure and cooling the heat exchanger of the other one of the moisture removal structures;

a control apparatus for controlling operation of the first and second moisture removal assemblies and the heat pump, the control apparatus being configured to sense a condition of the apparatus and reverse operation of the heat pump upon detecting that the condition has passed a predetermined level.

13. The system of claim 12 wherein the condition sensed by the control apparatus is a time of operation of the apparatus, and wherein the predetermined level of the condition comprises a predetermined period of time.

14. The system of claim 12 wherein the condition sensed by the control apparatus is pressure of a working fluid of the heat pump, and wherein the predetermined level of the condition comprises a pressure that is greater than a predetermined level of pressure.

15. The system of claim 12 wherein the condition sensed by the control apparatus is pressure of a working fluid of the heat pump, and wherein the predetermined level of the condition comprises a pressure that is less than a predetermined level of pressure.

16. The system of claim 12 wherein the condition sensed by the control apparatus is a rate of change in pressure of a working fluid of the heat pump, and wherein the predetermined level of the condition comprises a rate of change in pressure that is greater than a predetermined rate of pressure change.

17. The system of claim 12 wherein the control apparatus is configured to sense a condition of the apparatus and discontinue operation of the apparatus upon detecting that the condition has passed a predetermined level.

18. The system of claim 17 wherein the condition sensed by the control apparatus is a time of operation of the apparatus, and wherein the predetermined level of the condition comprises a predetermined period of time.

19. The system of claim 17 wherein the condition sensed by the control apparatus is a moisture level of a material being dried in the envelope, and wherein the predetermined level of the condition comprises a moisture level of the material that is less than a predetermined moisture level.

20. The system of claim 12 additionally comprising a perforated tube positionable in the interior of the envelope, the perforated tube being in fluid communication with the inlet structure.

* * * * *